US008506770B2

(12) United States Patent
Kiesel et al.

(10) Patent No.: US 8,506,770 B2
(45) Date of Patent: Aug. 13, 2013

(54) ELECTROCHEMICAL PLANARIZATION SYSTEM COMPRISING ENHANCED ELECTROLYTE FLOW

(75) Inventors: Axel Kiesel, Chemnitz (DE); Johannes Groschopf, Radebeul (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 661 days.

(21) Appl. No.: 12/645,583

(22) Filed: Dec. 23, 2009

(65) Prior Publication Data

US 2010/0163426 A1    Jul. 1, 2010

(30) Foreign Application Priority Data

Dec. 31, 2008   (DE) .......................... 10 2008 063 433
Nov. 17, 2009   (DE) .......................... 10 2009 046 750

(51) Int. Cl.
*C25F 3/16*     (2006.01)
*C25F 7/00*     (2006.01)
*C25D 17/00*    (2006.01)

(52) U.S. Cl.
USPC ................. 204/297.05; 204/224 M; 205/640

(58) Field of Classification Search
None
See application file for complete search history.

(56) References Cited

U.S. PATENT DOCUMENTS

| | | | |
|---|---|---|---|
| 6,066,030 A | 5/2000 | Uzoh | 451/41 |
| 6,379,223 B1* | 4/2002 | Sun et al. | 451/41 |
| 6,837,983 B2* | 1/2005 | Duboust et al. | 205/645 |
| 6,843,711 B1 | 1/2005 | Muldowney | 451/527 |
| 7,140,955 B2* | 11/2006 | Nabeya | 451/287 |
| 7,278,911 B2* | 10/2007 | Butterfield et al. | 451/526 |
| 2003/0114084 A1* | 6/2003 | Moon et al. | 451/36 |
| 2004/0214510 A1 | 10/2004 | So | 451/41 |
| 2005/0274626 A1 | 12/2005 | Tominaga | 205/654 |
| 2008/0188162 A1 | 8/2008 | Kobata et al. | 451/8 |

OTHER PUBLICATIONS

Translation of Official Communication from German Patent Office for German Patent Application No. 10 2009 046 750.5-43 dated Feb. 11, 2011.

* cited by examiner

*Primary Examiner* — Nicholas A Smith
*Assistant Examiner* — Brian W Cohen
(74) *Attorney, Agent, or Firm* — Williams, Morgan & Amerson, P.C.

(57) ABSTRACT

A polishing pad for an electrochemical planarization tool comprises a patterned surface that forms appropriate electrolyte flow channels for directing an electrolyte from the center to the periphery thereof. Consequently, a continuous electrolyte flow may be established, thereby significantly reducing the accumulation of contaminants in the polishing pad, thereby contributing to enhanced process uniformity so that frequent rinsing of the polishing pad and replacement of the electrolyte solution may be avoided.

17 Claims, 4 Drawing Sheets

ELECTROCHEMICAL PLANARIZATION SYSTEM COMPRISING ENHANCED ELECTROLYTE FLOW

BACKGROUND OF THE INVENTION

1. Field of the Invention

Generally, the subject matter disclosed herein relates to the field of manufacturing integrated circuits, and, more particularly, to planarization process techniques including a mechanical and a chemical removal mechanism used for the formation of advanced micro-structure devices, such as the metallization structures, including fragile dielectric materials.

2. Description of the Related Art

Typically, the fabrication of modern integrated circuits requires a large number of individual process steps, wherein a typical process sequence involves the deposition of conductive, semiconductive or insulating layers on an appropriate substrate. After deposition of the corresponding layer, device features are produced by patterning the corresponding layer with well-known means, such as photolithography and etching. As a consequence, by patterning a deposited layer, a certain topography will be created that also affects deposition and patterning of subsequent layers. Since sophisticated integrated circuits require the formation of a plurality of subsequent layers, it has become standard practice to periodically planarize the surface of the substrate to provide well-defined conditions for deposition and patterning of subsequent material layers. In other situations, any unwanted material may have to be removed, wherein typically used etch techniques may be less appropriate. This holds especially true for so-called metallization layers in which metal interconnects are formed to electrically connect the individual device features, such as transistors, capacitors, resistors and the like, to establish the functionality required by the circuit design.

In this situation, chemical mechanical planarization (CMP) has become a widely used process technique for removing unwanted material and reducing "imperfections" in the substrate topography caused by preceding processes in order to establish enhanced conditions for a subsequent process, such as photolithography and the like. The polishing process itself causes mechanical damage to the polished surface, however, in an extremely low range, i.e., at an atomic level, depending on the process conditions. Although CMP processes are widely used techniques within the entire manufacturing flow for producing sophisticated micro-structure products, these processes are also associated with a plurality of side effects that have to be addressed to be applicable to processes required for forming sophisticated semiconductor devices.

For example, recently, the so-called damascene or inlaid technique has become a preferred method in forming metallization layers, wherein a dielectric layer is deposited and patterned to receive trenches and vias that are subsequently filled with an appropriate metal, such as aluminum, copper, copper alloys, silver, tungsten and the like. Since the process of providing the metal may be performed as a "blanket" deposition process based on, for instance, electrochemical deposition techniques, the respective pattern of the dielectric material may require a significant over-deposition in order to reliably full narrow openings and wide regions or trenches in a common process. The excess metal is then removed and the resulting surface is planarized by performing a process sequence comprising one or more mechanical polishing processes, which also include a chemical component and/or an electro-chemical component. Chemical mechanical polishing (CMP) has proven to be a reliable technique to remove the excess metal and planarize the resulting surface to leave behind metal trenches and vias that are electrically insulated from each other as required by the corresponding circuit layout. Chemical mechanical polishing or electrochemical mechanical polishing typically requires the substrate to be attached to a carrier, a so-called polishing head, such that the substrate surface to be planarized is exposed and may be placed against a polishing pad. The polishing head and polishing pad are moved relative to each other by usually individually moving the polishing head and the polishing pad. Typically, the head and the pad are rotated against each other while the relative motion is controlled to locally achieve a desired material removal. During the polishing operation, typically, a slurry that may include a chemically reactive agent and possibly abrasive particles is supplied to the surface of the polishing pad.

Typically, the removal rate may be determined by process parameters, such as the relative speed of the surface to be polished and the polishing pad, the down force with which the substrate is pressed against the polishing pad, the type of slurry used and the mechanical characteristics of the polishing pad in combination with any abrasive particles provided in the pad and/or the slurry. Generally, chemical mechanical polishing is a highly complex process, wherein, in addition to controlling the above-specified process parameters, the continuously varying state of the polishing pad may also have to be taken into consideration in order to obtain the desired process output. Moreover, with increasing diameter of the respective substrates, which may be 300 mm in advanced semiconductor facilities, the resulting profile after the polishing process may vary due to certain process fluctuations, such as the locally varying state of the polishing pad, fluctuations during the slurry supply and the like. Consequently, sophisticated process control mechanisms have been established in an attempt to address the above-specified problems, wherein, for instance, the relative speed and the down force may be used as efficient parameters for controlling the polishing process. For example, in a typical polishing regime, a substantially linear dependence between the removal rate and the downward force and the substrate's linear velocity relative to the polishing pad may exist. Consequently, based on this process regime, the overall polishing rate may be controlled, wherein, by locally varying one of the above-identified parameters, a desired polishing profile across the substrate may be achieved. Hence, process inherent non-uniformities may be compensated for by appropriately adapting the local removal rate, and also any process non-uniformities of a preceding process step, for instance, the deposition of a specific material, may be taken account by appropriately adapting the local removal rate during the CMP process. In order to locally adjust the removal rate, for instance, the down force may be appropriately adjusted, for instance, by providing respective pressure zones in the polishing head, which may result locally in a different effective down force, thereby, however, requiring a certain degree of mechanical stability of any materials located below the material layer under consideration.

With the advance of semiconductor technology, so-called low-k dielectric materials are increasingly used in combination with highly conductive metals, such as copper, in order to further enhance the overall performance of respective semiconductor devices. In this respect, low-k dielectric materials are to be understood as insulating materials having a relative permittivity of 3.0 and less, while, recently, even so-called ultra low-k dielectrics have been introduced with a dielectric constant of 2.5 and less. However, the reduced relative permittivity is typically associated with a reduced mechanical stability of the corresponding materials, thereby resulting in highly fragile dielectric layer stacks, from which excess material, such as copper, has to be removed, for instance, by CMP. Due to the reduced mechanical stability of sophisticated dielectric materials, however, the down force during the polishing process may have to be increasingly reduced to an amount that is compatible with mechanical characteristics of the low-k dielectrics. This may, however, require, according to the above-specified linear dependency of the removal rate on the down force and the linear velocity, a respective increase of the speed of the relative motion between the polishing pad and the substrate. However, a respective increase of the relative motion may not necessarily translate into a higher removal rate in this polishing regime using extremely low down forces and, hence, in addition to a loss of process controllability, process efficiency may be reduced. Furthermore, other parameters such as the slurry flow and the like may be controlled in addition to the platen speed or the head speed, wherein, however, a highly complex mutual interaction of these parameters may require the development of highly complex process recipes, which may be difficult to be controlled in a feed forward or feedback regime, thereby contributing to reduced overall controllability and also to an increased probability of creating additional yield loss.

In view of this situation, electrochemical mechanical planarization or polishing processes may provide enhanced process conditions for removing excess metal from corresponding surface areas. During an electrochemical planarization process, an appropriate electrolyte solution may be provided in addition to or alternatively to a chemically reactive slurry material, and a voltage is established across the substrate surface to be treated and a corresponding cathode, wherein the electrolyte may thus establish the electrical contact between the contact surface and the cathode. Consequently, upon establishing a current flow from the substrate surface to the cathode via the electrolyte solution, increasingly, metal ions of the substrate surface may be dissolved, thereby maintaining a continuous material removal. Furthermore, due to the mechanical interaction between the polishing pad and the metal surface, pronounced surface topographies may be planarized in a highly efficient manner, similarly to the chemical mechanical polishing process. It turns out, however, that the required down force may be significantly lower compared to well-established CMP techniques, for instance for removing excess copper of sophisticated metallization systems, thereby contributing to enhanced production yield and superior reliability of the finally obtained metallization system. Furthermore, compared to conventional CMP strategies, a significantly reduced defect rate may be observed during the electrochemical polishing or planarization process, thereby making the electrochemical planarization process a promising process technique for sophisticated microstructure devices in which, frequently, metal-containing surface areas have to be planarized.

In conventional electrochemical planarization systems, a polishing pad may be provided that may have a conductive surface, which may be connected to the anode of the system in order to electrically connect the anode with the metal-containing surface to be treated. Moreover, corresponding holes may be provided in the polishing pad, for instance extending through the conductive layer and through an insulating sub pad to a conductive pad base layer that acts as a cathode, according to a specified pattern so as to establish electrical contact between the anode and thus the substrate surface to be polished and the cathode, i.e., the pad base layer. During the processing of a substrate, a current flow from the anode, i.e., the substrate surface, to a cathode may be established which may be accomplished via the electrolyte solution in the holes provided in the polishing pad, wherein, however, a desired polishing result may significantly depend on the overall process conditions and the status of the electrolyte in the holes. That is, during the processing, increasingly, metal residues and any other components of the polishing pad may be accommodated by the electrolyte in the holes, wherein these contaminants may result in a reduced electrolyte performance within the holes extending through the a portion of the polishing pad to the conductive pad base layer. Consequently, a state of the increasingly "exhausting" electrolyte may sensitively depend on the process history and may thus result in a significant process variability, unless well-defined process conditions may be restored for each substrate to be treated. For this reason, typically, the polishing pad may be rinsed, for instance on the basis of de-ionized water under high pressure, to remove any contaminants within the holes in the polishing pad, and also the corresponding electrolyte solution may be discharged and may thus be replaced by a fresh electrolyte solution.

As a consequence, although electrochemical planarization presents a promising approach for planarizing metal-containing surface areas and removing excess metal, such as copper, many of the advantages, i.e., the usage of cost-efficient electrolyte solutions instead of sophisticated chemically active slurries, enhanced defect rate and the like, may be offset by the requirement of frequent cleaning of the polishing pads and the replacement of the electrolyte solution, thereby reducing throughput and increasing cost of ownership.

The present disclosure is directed to various methods and devices that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure provides devices and techniques in which the efficiency of electrochemical planarization techniques may be increased by significantly increasing overall throughput without compromising process uniformity. For this purpose, a continuous electrolyte flow to the periphery of the polishing pad may be established, thereby continuously conveying any contaminants and metal residues, which may thus be continuously discharged in a corresponding electrolyte bath. The continuous electrolyte flow to the periphery of the polishing pad may be achieved on the basis of a patterned pad surface, in which appropriate electrolyte flow channels are formed. These electrolyte flow channels may provide a "radial" continuous electrolyte flow, which is to be understood as a flow of electrolyte solution that is generally directed to the periphery in the plane defined by the patterned surface of the polishing pad, irrespective of the actual flow direction with respect to a radius of the polishing pad. Consequently, these electrolyte flow channels are appropriately configured so as to maintain a continuous flow, i.e., any "dead" volumes within the patterned surface may be avoided in which an accumulation of contaminating substances may occur so that very uniform process conditions may be accomplished for a plurality of substrates without requiring any intermediate rinsing or cleaning processes. In some illustrative embodiments, the patterned surface may be formed on the basis of appropriate conductive protruding surface areas, which may thus represent corresponding lateral borders of the electrolyte flow channels, thereby enabling a contact with the metal surface to be planarized and also providing an appropriate pattern of the flow channels. In other illustrative aspects, the appropriate configuration of the electrolyte flow channels, which may provide a substantially continuous electrolyte flow, may enable sophisticated contact regimes since the electrolyte flow itself may be efficiently used as an electrical contact due to its continuous and thus highly uniform flow configuration. Consequently, in addition to enhanced throughput and defect rate, increased flexibility in configuring an electrochemical planarization tool may also be achieved.

One illustrative method disclosed herein relates to the removal of metal from a substrate surface. The method comprises moving a substrate surface of a first substrate relative to a polishing pad which comprises protruding surface areas. Furthermore, the method comprises electrically connecting the substrate surface with an anode and supplying an electrolyte between the polishing pad and the substrate surface. Finally, the method comprises establishing a continuous electrolyte flow to a periphery of the polishing pad to electrically contact a cathode by the continuous electrolyte flow.

One illustrative pad for an electrochemical planarization tool disclosed herein comprises a patterned pad surface to be positioned against a substrate surface to be treated, wherein the patterned pad surface comprises at least some electrically conductive protruding areas. Moreover, a plurality of electrolyte flow channels are formed in the patterned pad surface, wherein each of the plurality of electrolyte flow channels terminates at an edge of the patterned pad surface.

One illustrative electrochemical planarization tool disclosed herein comprises a platen configured to receive a polishing pad and a substrate carrier configured to receive a substrate having a surface to be planarized. The electrochemical planarization tool further comprises a drive assembly configured to establish a relative motion between the substrate and the platen. Furthermore, a polishing pad is attached to the platen and comprises a patterned surface to form a plurality of electrolyte flow channels, each of which terminates at a periphery of the patterned surface. The electrochemical planarization tool further comprises a container configured to accommodate the platen and an electrolyte bath. Furthermore, an electrolyte supply unit is provided and is configured to supply an electrolyte to a patterned surface of the polishing pad. Finally, the electrochemical planarization tool comprises a voltage supply unit that is configured to apply a voltage across the surface to be planarized and the electrolyte bath.

BRIEF DESCRIPTION OF THE DRAWINGS

The disclosure may be understood by reference to the following description taken in conjunction with the accompanying drawings, in which like reference numerals identify like elements, and in which.

Figure 1A:
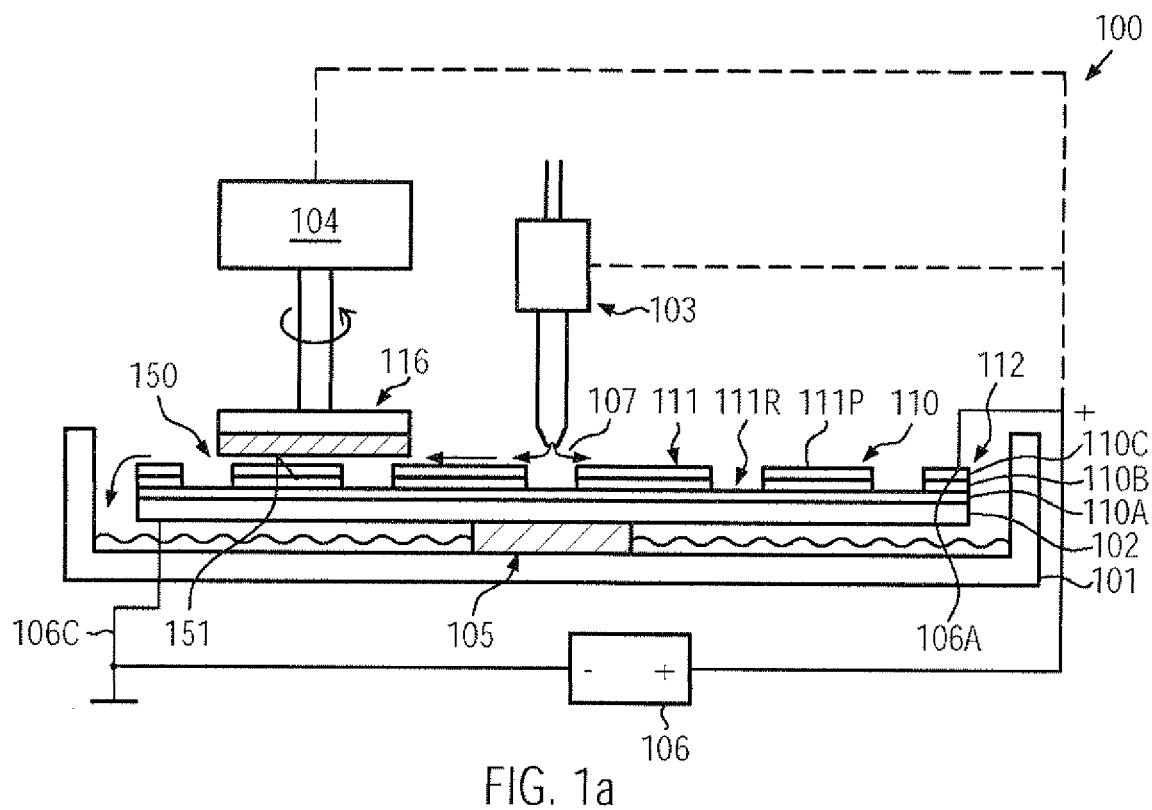
FIG. 1a schematically illustrates a cross-sectional view of an electrochemical planarization tool including a polishing pad having electrolyte flow channels, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The subject matter disclosed herein generally addresses the issue of reduced through-put and/or increased defect rate of electrochemical planarization processes due to inferior overall electrolyte flow caused by a configuration of conventional polishing pads. In order to enhance the overall efficiency, it has been recognized that process conditions during the electromechanical planarization process may be significantly enhanced by establishing a substantially continuous electrolyte flow during the processing, thereby also providing the possibility of significantly reducing the number of required intermediate cleaning processes, while, in some illustrative embodiments, a plurality of substrates may be processed without any intermediate rinsing or cleaning of the polishing pad. For this purpose, the surface of the polishing pad may be appropriately patterned to avoid the presence of any critical volume areas in which electrolyte solution may accumulate and may thus contribute to an enhanced defect rate when processing subsequent substrates without any intermediate rinsing activities. Such critical volumes within a patterned surface may be avoided by providing appropriate flow channels which may conduct the electrolyte solution substantially parallel to the surface, wherein, if desired, it may be taken advantage of the rotational movement of the polishing pad, which may thus promote the electrolyte transport from the center of the pad to the periphery. Consequently, in some illustrative embodiments, the electrolyte flow channels may be provided within the patterned surface such that areas of increased flow resistance may be avoided while nevertheless a sufficient surface area may be available for contacting the surface of the substrate to be planarized. For this purpose, the flow channels may have any appropriate configuration so as to avoid a "jamming" of the electrolyte during operation of the polishing pad, while, in some illustrative embodiments, at the same time, an appropriate contact regime for conductive surface areas may be provided so as to connect the metal-containing surface of the substrate with the anode of the planarization tool. On the other hand, the flow channels may provide a sufficient total cross-sectional area for conveying the electrolyte solution so that a desired degree of "renewing" of electrolyte across the entire polishing pad may be accomplished. For this purpose, the patterning of the pad surface may be configured such that the flow channels may have a generally gradual spiral or any other appropriate configuration, wherein these channels and thus the corresponding intermediate protruding surface areas may be divided into appropriate clusters, each of which may then be appropriately fluidly and electrically connected in order to establish the continuous electrolyte flow within each cluster and also provide a desired electrical contacting of a substrate surface.

In further illustrative embodiments, the continuous electrolyte flow established on the basis of the appropriately patterned pad surface may provide the possibility of configuring the contact regime for connecting the substrate surface to a supply voltage in order to provide an "anode" for the electrochemical planarization process. For example, due to enhanced uniformity of the electrolyte flow, the substrate surface to be treated may be connected "directly" with a corresponding supply voltage source, for instance, via a corresponding substrate holder and the like, since substantially uniform process conditions may be accomplished, for instance with respect to a current flow via the electrolyte solution, thereby simplifying the overall solution of the electrochemical planarization tool. Furthermore, in this case, the surface portions in contact with the substrate surface may not necessarily have to be provided as conductive surface areas due to the continuous and uniform supply and discharge of the electrolyte across the entire substrate to be treated.

Consequently, any high pressure rinse activities which may conventionally be used after a very restricted number of substrates may be avoided, or may at least be significantly reduced, thereby contributing to enhanced overall throughput. Furthermore, due to the continuous electrolyte flow, a corresponding regular replacement of the electrolyte solution, as is typically the case in conventional strategies, in which replacement may even be required after each substrate, may be avoided, thereby also reducing the consumption of consumables, which may thus result in reduced cost of ownership.

FIG. 1a schematically illustrates a cross-sectional view of an electrochemical planarization tool 100 comprising a container or vessel 101, which may accommodate a drive assembly 105 and a platen 102 attached thereto. The drive assembly 105 may be configured so as to rotate the platen 102 on the basis of appropriate process parameters. Furthermore, it should be appreciated that the drive assembly 105 may include any components so as to establish and maintain a specified rotational speed. For convenience, any such components, such as electric motors, electronic control units, mechanical mechanisms and the like, are not shown, since these components are well known in the art. Similarly, the platen 102 may have any appropriate configuration, for instance similar to conventional CMP tools and the like. Furthermore, the tool 100 may comprise a substrate carrier 116 that is mechanically connected to a drive assembly 104 that is configured to rotate the carrier 116 and a corresponding substrate 150 attached thereto. Similarly, any corresponding components, such as electric motors, mechanical components and the like, are not shown since these components are well established in the art. It should be appreciated, however, that the drive assembly 104 may typically be configured so as to appropriately position the substrate carrier 116 at any position across the platen 102 as is required for obtaining substantially uniform process conditions. Furthermore, the drive assembly 104 in combination with the substrate carrier 116 may be appropriately adapted in order to generate a desired down force which, however, may be significantly less compared to corresponding down forces required in conventional CMP tools, as previously explained. Furthermore, a polishing pad 110 is attached to the platen 102 and comprises a patterned surface 111 that is to be contacted with a substrate 150 during operation of the planarization tool 100. For example, the polishing pad 110 may comprise a conductive base layer 110A that may act as a cathode. Furthermore, an insulating pad layer 110B, also referred to as a sub pad, may be provided in the form of a perforated material layer, in combination with a conductive surface layer 110C. Hence, the pad layers 110B and 110C may represent the patterned surface 111. It should be appreciated that the patterned surface 111 is to be understood as a surface having a specified topography, i.e., a plurality of protruding surface areas 111P and corresponding recessed areas 111R may be provided in the patterned surface 111. As previously explained, the patterned surface 111 may comprise the protruding surface areas 111P and thus the recessed areas 111R in an appropriate configuration so as to enable a substantially continuous electrolyte flow to a periphery or edge 112 of the polishing pad 110. For this purpose, the patterned surface 111 may comprise appropriate flow channels (not shown in FIG. 1a) which may terminate at the periphery 112 so that any electrolyte in the flow channels may finally be transported to the periphery 112 and may be supplied to the container 101. Consequently, the patterned surface 111 of the polishing pad 110 may be configured to establish a "radial" electrolyte flow, i.e., an electrolyte flow parallel to a plane defined by a surface of the platen 102 or a surface 151 of the substrate 150 so that a generally different flow direction may be established compared to conventional electrochemical planarization tools, in which, generally, through holes through the polishing pad may be provided. As previously discussed, in some illustrative embodiments, the patterned surface 111 may be configured such that areas of increased flow resistance may be avoided, wherein areas of increased flow resistance may be understood as an area in which the flow of electrolyte may significantly slow down or may even be interrupted, thereby allowing accumulation of contaminants, such as metal residues, residues of the surface 111 and the like.

The electrochemical planarization tool 100 may further comprise a supply unit 103 that may be configured to supply an electrolyte solution to a specified position above the polishing pad 110. In some illustrative embodiments, a unit 103 may have a substantially fixed position above the polishing pad 110, while, in other illustrative embodiments, the unit 103 may be moveable across the polishing pad 110 in accordance with a specified spatial and time pattern in order to enable a corresponding local and temporal control of the electrolyte supply. For convenience, the corresponding drive assembly or position of the unit 103 above the operation pad 110 is not shown. Furthermore, the tool 100 may comprise a voltage supply unit 106 to establish a current flow from the substrate surface 151 to a cathode formed by any dedicated electrode assembly. For example, in the embodiment shown, a cathode 106C may be represented by the container 101 or any electrode assembly attached thereto, while an anode 106A may be provided in the form of an appropriate contact assembly so as to connect to the periphery 112 of the polishing pad 110. Thus, as previously explained, in this case, the patterned surface 111 may comprise at least some electrically conductive surface areas, such as the protruding areas 111P, which are appropriately connected to the periphery 112, for instance by contact rings or any other appropriate electrode assembly, as is well known for conventional electrochemical planarization tools. In other illustrative embodiments, the anode 106A may be established by connecting the unit 106 to the substrate carrier 116, for instance via the drive assembly 104, wherein an appropriate contact regime may be provided in the carrier 116 so as to finally connect to the surface 151. In other cases, the anode 106A may be provided in the form of a contact to the supply unit 103 and a corresponding electrolyte solution supplied to the surface 111 during the operation of the tool 100.

Figure 1B:
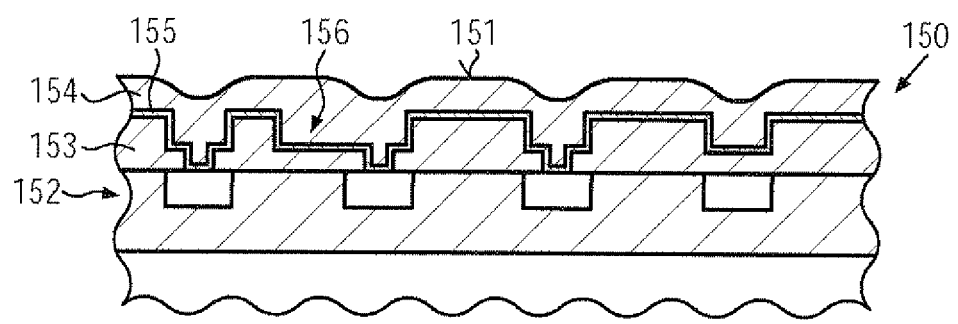
FIG. 1b schematically illustrates a cross-sectional view of a substrate comprising a metal-containing surface to be treated, wherein the surface may represent the surface of a sophisticated metallization system of a semiconductor device, according to illustrative embodiments.

FIG. 1b schematically illustrates a cross-sectional view of the substrate 150 according to illustrative embodiments in which the substrate 150 may represent a sophisticated microstructure device having the surface 151, from which metal is to be removed. In the embodiment shown, the surface 151 may represent an initial surface of a metallization system 152 prior to the removal of metal therefrom. For instance, the metallization system 152 may comprise a plurality of metallization layers, each of which may comprise a dielectric material 153, for instance in the form of a low-k dielectric material, in which corresponding metal regions 156 may be embedded. The metal regions 156 may be filled with any appropriate metal-containing material 154, such as tungsten, copper, aluminum, silver and the like, possibly in combination with other metal components, such as a conductive barrier material 155, which may frequently be used for increasing adhesion, improving metal confinement, enhancing electromigration behavior and the like. For example, the metallization system 152 may represent the wiring system of a sophisticated semiconductor device including copper-based metal lines formed in dielectric materials having a dielectric constant of 3.0 and less so that an application of reduced down forces during the corresponding removal process may contribute to increased production yield and enhanced reliability and performance of the metallization system 152.

During operation of the system 100, the substrate 150 may be positioned on the substrate carrier 116 and may be placed against the patterned surface 111. Furthermore, an electrolyte 107 may be supplied by the unit 103 and a relative motion between the substrate 150 and the polishing pad 110 may be established, for instance by means of the drive assemblies 104, 105, as previously explained. Upon establishing a current flow via the voltage supply unit 106 from the anode 106A to the cathode 106C and the electrolyte 107, an electrochemical reaction may occur at the surface 151, thereby releasing metal ions into the electrolyte solution, which may result in a corresponding material removal, while also the corresponding mechanical component, i.e., the motion of the surface 151 against the patterned surface 111 may also contribute to an increased removal rate at protruding areas of the surface 151, thereby increasingly raising the resulting surface topography, even at moderately low down forces compared to conventional CMP techniques. Furthermore, due to the patterned surface 111, a substantially continuous electrolyte flow may be established to the periphery 112 so that a corresponding constant discharging of any contaminants, such as metal residues, residues of the polishing pad 110 and the like, may be accomplished, thereby providing uniform process conditions during the entire removal process. Thereafter, the substrate 150 may be replaced by another substrate without requiring any intermediate rinsing processes, as is the case in conventional electrochemical CMP tools, as previously discussed, since the continuous electrolyte flow and thus the efficient removal of contaminants may result in very uniform process conditions even after processing a plurality of substrates 150 without any intermediate cleaning activities.

Figure 1C:
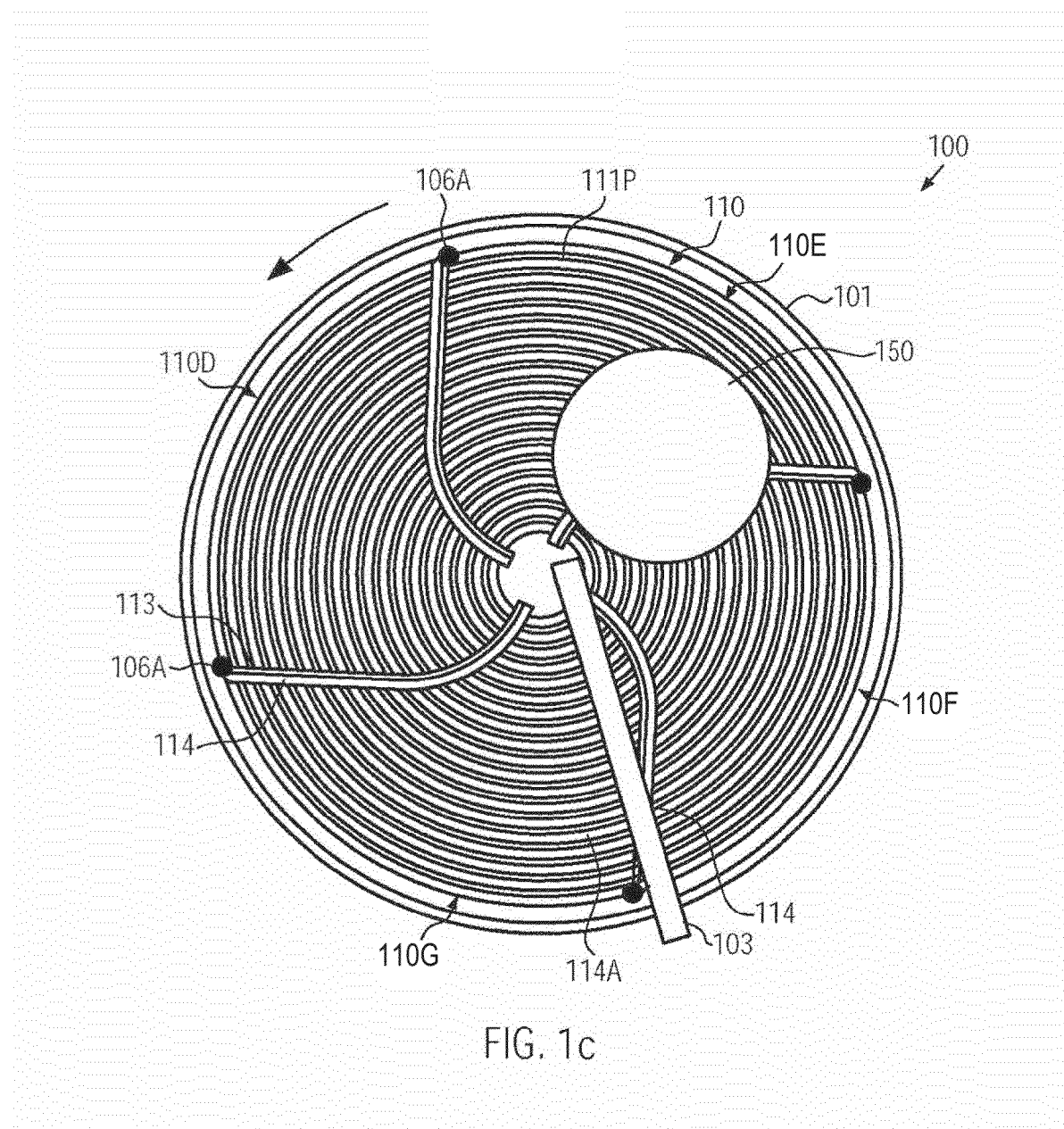
FIGS. 1c-1d schematically illustrate top views of a patterned surface of a polishing pad including sophisticated electrolyte flow channels for establishing a continuous electrolyte flow, according to illustrative embodiments.

FIG. 1c schematically illustrates a top view of a portion of the electrochemical planarization tool. As illustrated, in the embodiment shown, the polishing pad 110 may comprise a plurality of electrolyte flow channels 114, which may terminate at the periphery of the polishing pad 110. In this respect, the term "terminate" is to be understood as an open ending of the corresponding flow channels 114 so that electrolyte flowing in the channels 114 may be freely supplied into the container 101. In the embodiment shown, the flow channels 114 may be delineated by corresponding protruding surfaces 111P, which may be provided in the form of conductive elements, i.e., at least a top surface of the areas 111P may be provided in the form of a conductive material. For example, the polishing pad 110 may be comprised of well-established materials, as may also be used in conventional electrochemical planarization tools, which may comprise polishing pads with a conductive surface and with respective through holes formed therein. Thus, the polishing pad 110 may have a corresponding pattern formed therein so as to define the flow channels 114 that provide flow of electrolyte to the periphery of the polishing pad 110 during the operation of the tool 100. Furthermore, in the embodiment shown, the flow channels 114 may represent a "manifold" fluidly connected to a plurality of further flow channels 114A, which, in the embodiment shown, may have a substantially concentric configuration. Consequently, any electrolyte within the channels 114A may, upon rotating the polishing pad 110, be conducted to the corresponding flow channel 114, which in turn may fluidly connect to the periphery of the polishing pad 110 and thus to the container 101. In the embodiment shown, the polishing pad 110 may be divided into a plurality of segments or clusters 110D, 110E, 110F, 110G each of which may include one of the fluid channels 114 and a plurality of corresponding channels 114A. For example, the cluster or segment 110G may be fluidly connected to the channel 114 at the left-hand side and may be delineated by the channel 114 at the right-hand side. Thus, upon rotating the polishing pad 110, each of the channels 114A may connect to the corresponding manifold 114 without inducing an increased flow resistance so that electrolytes supplied by the unit 103 approximately at the center of the pad 110 and any electrolyte supplied to the channels 114A during operation may be efficiently conveyed to the periphery of the polishing pad 110, thereby maintaining a continuous electrolyte flow, which may result in very uniform process conditions, even after processing a plurality of substrates without intermediate cleaning processes.

Furthermore, each of the protruding surface areas 111P may finally be connected to the anode 106A since each cluster or segment 110D, 110E, 110F, 110G of each surface portion 111P is connected to at least a surface portion 113 defining the corresponding flow channel 114, which in turn is connected to the anode 106A on the basis of any appropriate contact regime, as previously explained. Consequently, the desired potential may be applied to the surface of the substrate 150, since each of the surface portions 111P is connected to the anode 106A. It should be appreciated that the design of the polishing pad 110 as shown in FIG. 1c is of illustrative nature only and many other designs may be used in which an efficient continuous electrolyte flow from the center to the periphery of the polishing pad 110 may be accomplished substantially without creating any areas of substantially non-flowing electrolyte, which may result in increased contamination and process non-uniformity.

Figure 1D:
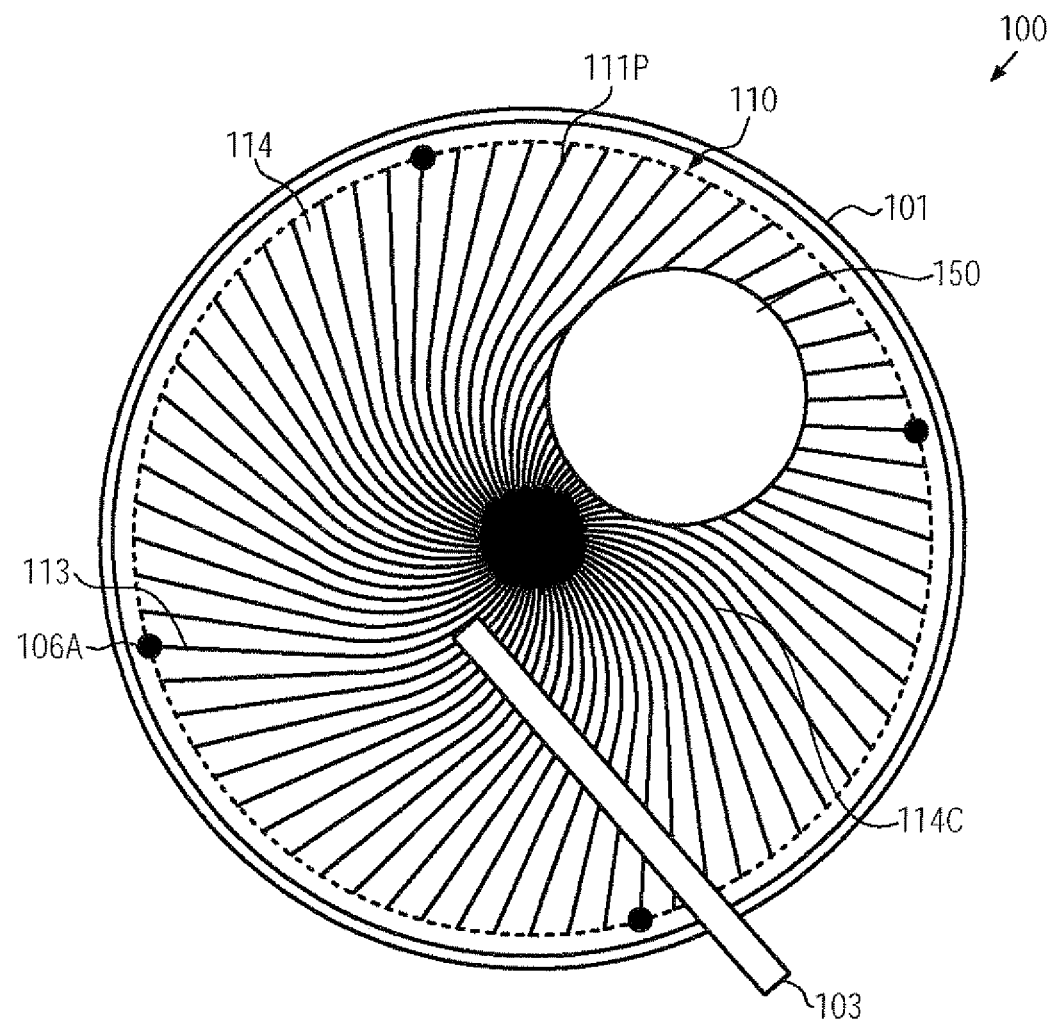

FIG. 1d schematically illustrates a top view of a portion of the tool 100 with the polishing pad 110 according to still further illustrative embodiments. As illustrated, the electrolyte flow channels 114 may be configured in a "spiral" kind of arrangement wherein each of the flow channels 114 may terminate at the periphery of the polishing pad 110. Furthermore, the corresponding protruding surface areas 111P, defining the flow channels 114, may merge at a center area 114C so that each of the surface areas 111P may be in contact with the voltage supply unit (see FIG. 1a) in order to represent the anode 106A. For this purpose, at least one of the areas 111P may act as a corresponding contact area 113 for connecting to the supply voltage. An enhanced reliability and uniformity of the current distribution may be considered appropriate, two or more of the portions 111P may act as conductive paths so as to connect the voltage supply unit. Furthermore, as illustrated in FIG. 1d, in order to enhance the electrolyte flow within the channels 114, the electrolyte supply unit 103 may be appropriately positioned so as to supply the electrolyte directly into channels 114, which may be accomplished by offsetting the end portion of the unit 103 from the center region 114C. Thus, during operation of the tool 100 using the polishing pad 110 as shown in FIG. 1d, a continuous and uniform electrolyte flow may be accomplished.

Figure 1E:
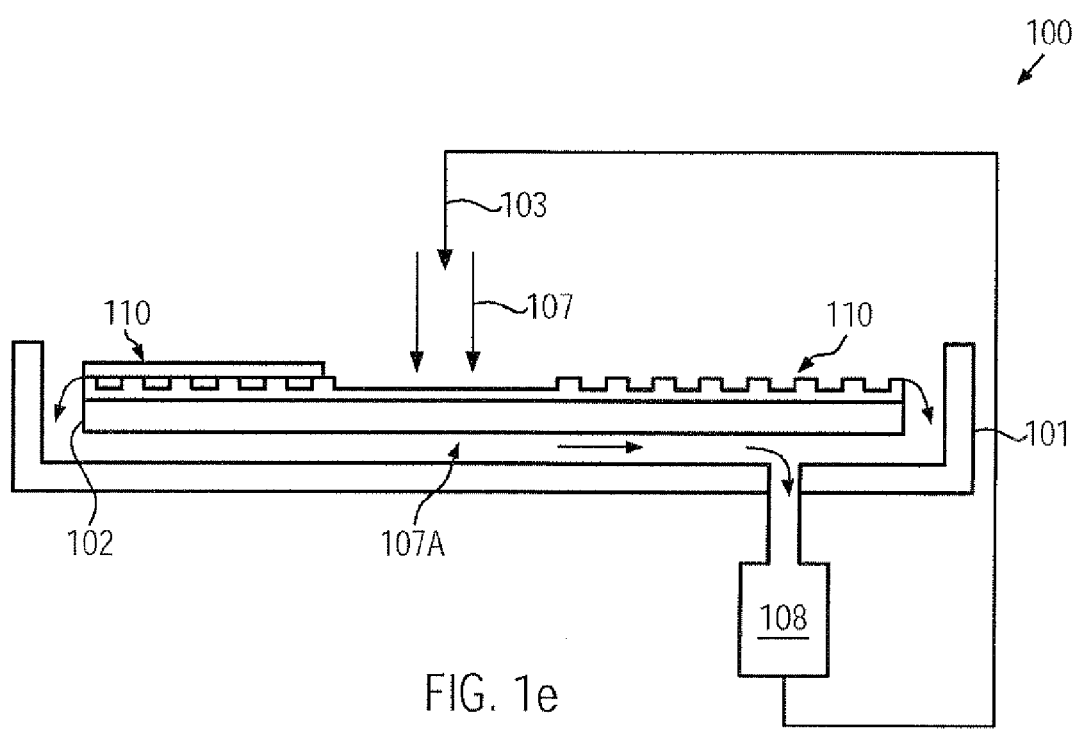
FIG. 1e schematically illustrates an electrochemical planarization tool including a sophisticated polishing pad and a system for maintaining a substantially continuous electrolyte flow, according to still further illustrative embodiments.

FIG. 1e schematically illustrates a cross-sectional view of the electrochemical planarization tool 100 according to still further illustrative embodiments. As illustrated, the tool 100 may comprise a re-circulation unit 108, which may be fluidly connected to the container 101 containing an electrolyte bath 107A. Thus, during operation of the tool 100, the electrolyte 107 may be supplied via the unit 103 to the polishing pad 110 and the corresponding continuous electrolyte flow established therein may result in a continuous flow of electrolyte into the bath 107A, which may be coupled to the re-circulation unit 108. Thus, the unit 108 may supply electrolyte to the unit 103, thereby establishing an efficient circular system for the electrolyte solution 107. In some illustrative embodiments, the re-circulation unit 108 may further comprise appropriate cleaning or conditioning systems, for instance in the form of filter systems and the like, in which any contaminants may be efficiently removed prior to applying the reworked electrolyte solution to the unit 103. It should further be appreciated that the re-circulation unit 108 may comprise an appropriate reservoir of "fresh" electrolyte solution to compensate for any electrolyte losses for any electrolyte that may be temporarily reworked and may not be available for being supplied to the unit 103.

As a result, the present disclosure provides electrochemical planarization tools, corresponding polishing pads and methods of operating the same in which enhanced throughput and a reduction of electrolyte consumption may be accomplished by establishing a continuous electrolyte flow in the polishing pad from the center to the periphery thereof by providing appropriately designed electrolyte flow channels.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A pad for an electrochemical planarization tool, the pad comprising:
a patterned pad surface that is adapted to be positioned against a substrate surface to be treated, said patterned pad surface comprising a plurality of first electrically conductive protruding surface areas and a plurality of second electrically conductive protruding surface areas;
a plurality of first electrolyte flow channels formed in said patterned pad surface, wherein each of said plurality of first electrolyte flow channels is laterally delineated by a respective one of said plurality of first electrically conductive protruding surface areas and at least some of said plurality of first electrolyte flow channels extend from proximate a center of said patterned pad surface and terminate at an edge of said patterned pad surface; and
a plurality of second electrolyte flow channels formed in said patterned pad surface, wherein each of said plurality of second electrolyte flow channels is defined by at least one of said plurality of second electrically conductive protruding surface areas, at least some of said plurality of second electrolyte flow channels are fluidly connected to at least one of said plurality of first electrolyte flow channels, and at least some of said plurality of second electrically conductive protruding surface areas are connected to at least one of said plurality of first electrically conductive protruding surface areas.

2. The pad of claim 1, wherein said at least one of said plurality of first electrically conductive protruding surface areas comprises at least one contact area that is adapted to be connected to a power supply of said electrochemical planarization tool.

3. The pad of claim 2, wherein each of said pluralities of first and second electrically conductive protruding surface areas is electrically connected to said at least one contact area.

4. The pad of claim 1, wherein said pluralities of first and second of electrically conductive protruding surface areas comprise a plurality of protruding surface area clusters.

5. An electrochemical planarization tool, comprising:
a platen configured that is adapted to receive a polishing pad;
a substrate carrier that is adapted to receive a substrate, said substrate comprising a surface to be planarized;
a drive assembly that is adapted to establish a relative motion between said substrate and said platen;

a polishing pad attached to said platen, said polishing pad comprising a patterned surface, said patterned surface comprising:
- a plurality of first electrolyte flow channels, wherein each of said plurality of first electrolyte flow channels is laterally delineated by one of a plurality of first protruding surface areas, extends from proximate a center of said patterned surface and terminates at a periphery of said patterned surface; and
- a plurality of second electrolyte flow channels, wherein each of said plurality of second electrolyte flow channels is defined by a pair of a plurality of second protruding surface areas and is fluidly connected to at least one of said plurality of first electrolyte flow channels, each of said plurality of second protruding surface areas being connected to at least one of said plurality of first protruding surface areas;

a container that is adapted to accommodate said platen and an electrolyte bath;

an electrolyte supply unit that is adapted to supply an electrolyte to said patterned surface of the polishing pad; and a voltage supply unit configured to apply a voltage across said surface to be planarized and said electrolyte bath.

6. The electrochemical planarization tool of claim 5, wherein said voltage supply unit is adapted to electrically contact the periphery of said polishing pad.

7. The electrochemical planarization tool of claim 5, wherein said voltage supply unit is electrically connected to said substrate carrier.

8. The electrochemical planarization tool of claim 5, wherein said voltage supply unit is electrically connected to said electrolyte supply unit.

9. The electrochemical planarization tool of claim 5, further comprising a re-circulation unit fluidly connected between said electrolyte supply unit and said electrolyte bath.

10. The electrochemical planarization tool of claim 5, wherein said polishing pad comprises a conductive base layer and a plurality of patterned pad layers above said conductive base layer.

11. The electrochemical planarization tool of claim 10, wherein said plurality of patterned pad layers define said pluralities of first and second protruding surface areas.

12. The electrochemical planarization tool of claim 10, wherein said plurality of patterned pad layers comprises an insulating pad layer and a conductive surface layer above said insulating pad layer.

13. The electrochemical planarization tool of claim 12, wherein said conductive surface layer is adapted to contact said surface to be planarized during operation of said electrochemical planarization tool.

14. The pad of claim 1, wherein said polishing pad comprises a conductive base layer and a plurality of patterned pad layers above said conductive base layer, said patterned pad layers defining said patterned pad surface.

15. The pad of claim 14, wherein said plurality of patterned pad layers comprises an insulating pad layer and a conductive surface layer above said insulating pad layer.

16. A patterned pad for an electrochemical planarization tool, the patterned pad comprising:
- a plurality of first protruding areas, at least one of said plurality of first protruding areas extending from proximate a center of said patterned pad to an edge of said patterned pad;
- a plurality of second protruding areas, each of said plurality of second protruding areas connecting to at least one of said plurality of first protruding areas, wherein at least some of said pluralities of first and second protruding areas comprise an electrically conductive surface layer that is adapted to be positioned against a substrate surface to be treated by said electrochemical planarization tool;
- a plurality of first electrolyte flow channels, wherein each of said plurality of first electrolyte flow channels is defined by a respective one of said first protruding areas; and
- a plurality of second electrolyte flow channels, wherein each of said plurality of second electrolyte flow channels is defined by adjacent pairs of said plurality of second protruding areas and is fluidly connected to at least one of said plurality of first electrolyte flow channels.

17. The patterned pad of claim 16, wherein at least one of said protruding surface areas comprising said electrically conductive surface layer comprises at least one contact area that is adapted to be connected to a power supply of said electrochemical planarization tool.

* * * * *